US012743266B2

(12) United States Patent
Maruyama et al.

(10) Patent No.: US 12,743,266 B2
(45) Date of Patent: Sep. 22, 2026

(54) SOFTWARE UPDATE IN-VEHICLE WITH A PORTABLE DEVICE

(71) Applicant: SUBARU CORPORATION, Tokyo (JP)

(72) Inventors: Shun Maruyama, Tokyo (JP); Hideaki Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 302 days.

(21) Appl. No.: 18/628,315

(22) Filed: Apr. 5, 2024

(65) Prior Publication Data

US 2024/0345827 A1 Oct. 17, 2024

(30) Foreign Application Priority Data

Apr. 13, 2023 (JP) ................................ 2023-065308

(51) Int. Cl.
*G06F 8/65* (2018.01)
*H04W 4/44* (2018.01)
*H04W 28/06* (2009.01)

(52) U.S. Cl.
CPC ................ *G06F 8/65* (2013.01); *H04W 4/44* (2018.02); *H04W 28/06* (2013.01)

(58) Field of Classification Search
CPC ............ G06F 8/65; H04W 4/44; H04W 28/06
USPC .................................................. 717/168–174
See application file for complete search history.

(56) References Cited

U.S. PATENT DOCUMENTS 6,607,136 B1 * 8/2003 Atsmon ................. G06Q 20/40 235/487
8,417,258 B2 * 4/2013 Barnes, Jr. ............. G06Q 20/12 455/414.3
8,954,719 B2 * 2/2015 Dicks ........................ G06F 9/44 713/2
10,573,093 B2 * 2/2020 Breed .................... G07C 5/008
11,308,269 B1 * 4/2022 Rodgers .................. G06F 40/18
11,333,505 B2 * 5/2022 Zhang ................ G01C 21/3837

(Continued)

FOREIGN PATENT DOCUMENTS

WO 2014087613 A1 6/2014

OTHER PUBLICATIONS

Bermejo-Agueda et al "Unveiling Network Performance in the Wild: An Ad-Driven Analysis of Mobile Download Speeds", ACM, pp. 1-13 (Year: 2022).*

(Continued)

*Primary Examiner* — Anil Khatri
(74) *Attorney, Agent, or Firm* — TROUTMAN PEPPER LOCKE LLP

(57) ABSTRACT

An in-vehicle apparatus configured to enable effective software downloading by distributing download tasks among multiple portable devices. An in-vehicle apparatus includes a communicator that communicates with the portable devices, and a processor that acquires speed datasets from the portable devices, each indicating a communication speed between a respective portable device and a server. Based on the speed datasets, the processor assigns data files to the portable devices and requests the portable devices to download the respectively assigned data files from the server. The in-vehicle apparatus receives the downloaded data files from the portable devices and updates its software accordingly.

11 Claims, 13 Drawing Sheets

(56) References Cited

U.S. PATENT DOCUMENTS

| | | | | |
|---|---|---|---|---|
| 11,704,107 | B2 * | 7/2023 | McFarland, Jr. | G06F 8/65 717/168 |
| 11,775,288 | B2 * | 10/2023 | Kang | G06F 8/71 717/170 |
| 11,886,860 | B2 * | 1/2024 | Pal | G06F 8/65 |
| 12,450,050 | B2 * | 10/2025 | Ishikawa | G06F 8/654 |
| 2015/0347121 | A1 | 12/2015 | Harumoto | |

OTHER PUBLICATIONS

Gerber et al, "Speed Testing without Speed Tests: Estimating Achievable Download Speed from Passive Measurements", ACM, pp. 1-8 (Year: 2010).*
Onuma et al, "ECU Software Updating in Future Vehicle Networks", IEEE, pp. 1-6 (Year: 2017).*
Xu et al, "Research on the Design of Software Upgrade for Special Vehicles Based on OTA Technology", IEEE, p. 1-6 (Year: 2014).*
Sarwar et al, "Network of ECU software Update in Future Vehicles", ACM, pp. 1-5 (Year: 2019).*

* cited by examiner

SOFTWARE UPDATE IN-VEHICLE WITH A PORTABLE DEVICE

CROSS-REFERENCE TO RELATED APPLICATIONS

The present application claims priority from Japanese Patent Application No. 2023-065308 filed on Apr. 13, 2023, the entire contents of which are hereby incorporated by reference.

BACKGROUND

The disclosure relates to an in-vehicle apparatus to be applied to a vehicle.

In-vehicle apparatuses are often subjected to software updates. For example, International Patent Application Publication WO 2014/087613 A1 discloses a technique in which a smartphone downloads updating data that is suitable for a vehicle from a server apparatus and transfers the downloaded data to an in-vehicle apparatus.

SUMMARY

An aspect of the disclosure provides an in-vehicle apparatus that achieves effective software downloading in a short time. The in-vehicle apparatus includes a communicator that communicates with portable devices, and a processor. The processor acquires, from the portable devices communicably coupled to the communicator, speed datasets each indicating a communication speed between a respective one of the portable devices and a server. Based on the speed datasets, the processor assigns data files to be downloaded from the server to the portable devices, and requests the portable devices to download the respectively assigned data files from the server. The portable devices download the assigned data files and transfer them to the in-vehicle apparatus, which updates its software based on the received data files.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

DETAILED DESCRIPTION

Figure 1:
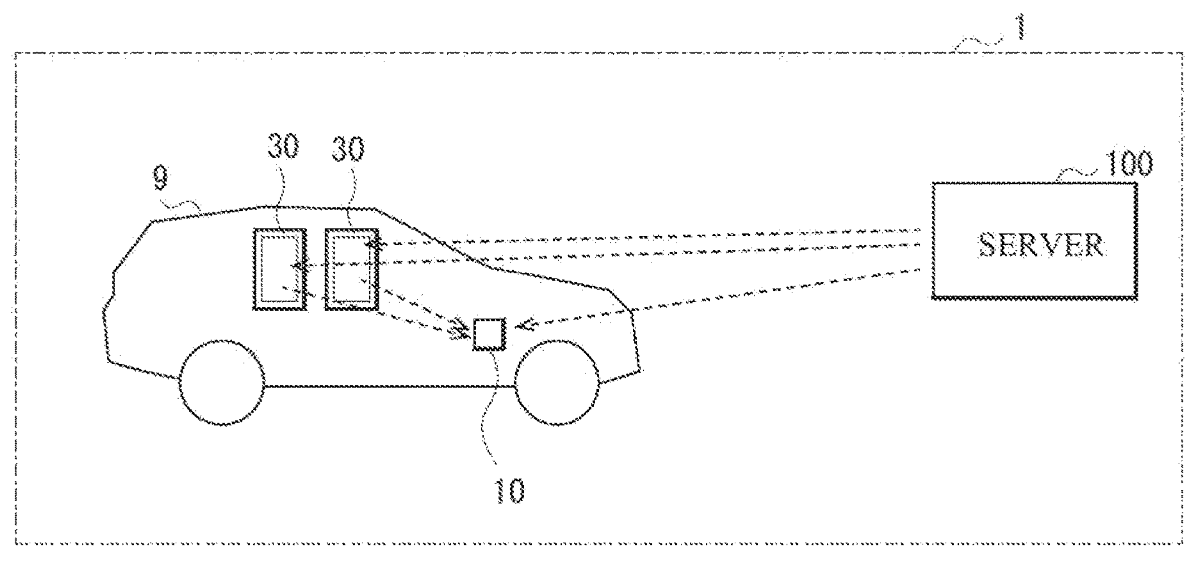
FIG. 1 is a diagram illustrating a configuration example of a communication system according to one example embodiment of the disclosure.

There is a general demand for fast data downloading, and it has been expected to achieve effective data downloading in a short time.

It is desirable to provide an in-vehicle apparatus that makes it possible to achieve effective downloading in a short time.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

FIG. 1 illustrates a configuration example of a communication system 1 according to an example embodiment. The communication system 1 may include a vehicle 9 and a server 100.

The vehicle 9 may be, for example, an automobile. The vehicle 9 includes an in-vehicle apparatus 10. The in-vehicle apparatus 10 is configured to control travel of the vehicle 9. The in-vehicle apparatus 10 may be configured to communicate with the server 100 via the Internet (not illustrated) through mobile communication such as 4th generation (4G) mobile communication or 5th generation (5G) mobile communication, or through wireless network communication such as wireless local area network (LAN) communication.

A smartphone 30 may be owned by an occupant of the vehicle 9. In this example, there may be smartphones 30 inside the vehicle 9. In FIG. 1, two smartphones 30 are illustrated. Each of the smartphones 30 may be configured to communicate with the in-vehicle apparatus 10 through, for example, wireless network communication such as wireless LAN communication. Further, the smartphone 30 may be configured to communicate with the server 100 via the Internet (not illustrated) through, for example, mobile-phone communication such as 4G mobile-phone communication or 5G mobile-phone communication or through wireless network communication such as wireless LAN communication.

The server 100 may be coupled to the Internet (not illustrated). In this example, the server 100 may manage software used in the vehicle 9. When the software used in the vehicle 9 is upgraded, for example, the server 100 may send the in-vehicle apparatus 10 a notification indicating that updating software is in the server 100 and may transmit a data file of the updating software to the smartphone 30 in response to a request from the smartphone 30.

In the communication system 1 having such a configuration, the in-vehicle apparatus 10 displays a QR code (registered trademark) when receiving, from the server 100, the notification indicating that the updating software adapted to update the software used in the in-vehicle apparatus 10 is in the server 100. The QR code may include data indicating a connection setting to the server 100 and data indicating a connection setting to the in-vehicle apparatus 10. For example, each of the smartphones 30 may acquire the connection setting to the server 100 and the connection setting to the in-vehicle apparatus 10 by capturing the QR code in response to an operation of the occupant who is the owner of the smartphone 30. Thereafter, based on the connection setting to the in-vehicle apparatus 10, the smartphone 30 may establish a communication connection to the in-vehicle apparatus 10. Further, each of the smartphones 30 may send the in-vehicle apparatus 10 data on a communication speed of the smartphone 30 in the communication between the smartphone 30 and the server 100. Based on the communication speeds of the smartphones 30, for example, the in-vehicle apparatus 10 may sequentially assign respective data files included in the updating software to the smartphones 30. The smartphones 30 may each establish a communication connection to the server 100 based on the connection setting to the server 100 and may sequentially download the assigned data files from the server 100. Thereafter, the smartphones 30 may transfer the downloaded data files to the in-vehicle apparatus 10. The in-vehicle apparatus 10 may update the software by performing an installation operation based on the data files transferred from the smartphones 30. In the communication system 1 described above, the respective data files are assigned to the smartphones 30 based on the communication speeds of the smartphones 30. Accordingly, a data file having a large file size may be assigned to the smartphone 30 having a high communication speed, for example. It is therefore possible to achieve effective downloading in a short time.

Figure 2:
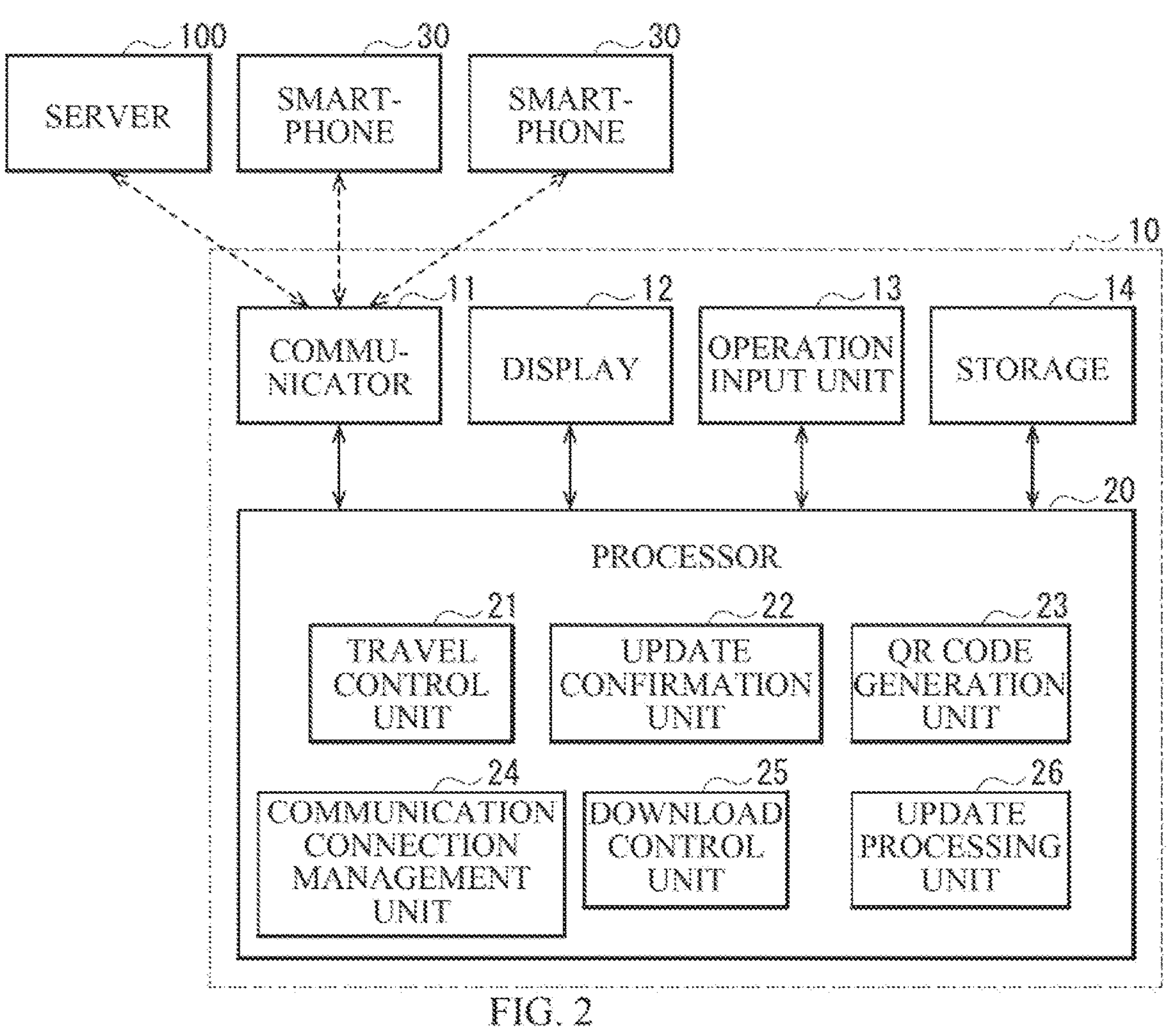
FIG. 2 is a block diagram illustrating a configuration example of an in-vehicle apparatus illustrated in FIG. 1.

FIG. 2 illustrates a configuration example of the in-vehicle apparatus 10. In FIG. 2, two smartphones 30 and the server 100 are illustrated. The in-vehicle apparatus 10 may include a communicator 11, a display 12, an operation input unit 13, a storage 14, and a processor 20.

The communicator 11 may include, for example, one or more communication devices. The communicator 11 may be configured to communicate with the server 100 via the Internet (not illustrated) through mobile communication or wireless network communication, for example. The communicator 11 may be further configured to communicate with the smartphones 30 through wireless network communication, for example.

The display 12 may include a display panel such as a liquid crystal display panel or an organic electroluminescent (EL) display panel. The display 12 may be configured to display information to be notified to the occupant or a QR code to be described later.

The operation input unit 13 may include, for example, a touch sensor and various buttons. The operation input unit 13 may be configured to receive an operational input performed by the occupant.

The storage 14 may include a non-volatile storage such as a flash memory or a hard disk drive (HDD). The storage 14 may be configured to store software and various kinds of data.

The processor 20 may include, for example, one or more processing units and one or more semiconductor memories. The processor 20 may be configured to control the travel of the vehicle 9. The processor 20 may perform a process by executing software installed in the in-vehicle apparatus 10. The processor 20 may include a travel control unit 21, an update confirmation unit 22, a QR code generation unit 23, a communication connection management unit 24, a download control unit 25, and an update processing unit 26.

The travel control unit 21 may be configured to control the travel of the vehicle 9 by controlling operations of a power source such as a motor or an engine, a steering device, and a braking device of the vehicle 9, for example. For instance, the travel control unit 21 may control the travel of the vehicle 9 based on a driving operation performed by a driver using a steering wheel, an accelerator pedal, a brake pedal, or the like.

The update confirmation unit 22 may be configured to confirm whether the updating software adapted to update the software used in the in-vehicle apparatus 10 is in the server 100. For example, the update confirmation unit 22 may confirm whether the updating software is in the server 100 by confirming whether the notification indicating that the updating software is in the server 100 has been received from the server 100. The notification indicating that the updating software is in the server 100 may include data on the names of the data files of the updating software and data on the file sizes of the data files.

The QR code generation unit 23 may be configured to generate a QR code to be displayed on the display 12. The QR code may be a pattern image including the data indicating the connection setting to the server 100 and the data indicating the connection setting to the in-vehicle apparatus 10. The data indicating the connection setting to the server 100 may be data indicating the connection setting to be used by the smartphone 30 to establish the communication connection to the server 100. The data indicating the connection setting to the server 100 may include, for example, a uniform resource locator (URL) of the server 100, a username, a password, and the like. The data indicating the connection setting to the in-vehicle apparatus 10 may be data indicating the connection setting to be used by the smartphone 30 to establish the communication connection to the in-vehicle apparatus 10. The data indicating the connection setting to the in-vehicle apparatus 10 may include, for example, an identifier, a password, and the like of the in-vehicle apparatus 10. Accordingly, the smartphone 30 may be configured to capture the QR code and acquire the connection setting to the server 100 and the connection setting to the in-vehicle apparatus 10 based on the result of capturing.

The communication connection management unit 24 may be configured to manage the communication connection of the smartphone 30 to the in-vehicle apparatus 10. For example, the communication connection management unit 24 may manage the smartphone 30 establishing the communication connection to the in-vehicle apparatus 10 in association with the communication speed of the smartphone 30 in the communication between the smartphone 30 and the server 100. The communication speed may be, for example, an actual communication speed of the smartphone 30 obtained upon actual communication between the smartphone 30 and the server 100, or a communication speed estimated based on a standard of wireless communication used for the communication between the smartphone 30 and the server 100. Examples of the standard of wireless communication may include 4G, 5G and wireless LAN. For example, the communication connection management unit 24 may estimate that the communication speed of the wireless LAN is higher than or equal to the communication speed of 4G. Further, for example, the communication connection management unit 24 may estimate that the communication speed of 5G is higher than the communication speed of the wireless LAN.

The download control unit 25 may be configured to control an operation performed by the smartphone 30 to download the data file from the server 100 when the smartphone 30 establishes the communication connection to the in-vehicle apparatus 10. For example, upon the communication between the smartphones 30 and the in-vehicle apparatus 10, the download control unit 25 may sequentially assign the respective data files included in the updating software to the smartphones 30 based on the communication speeds of the smartphones 30. For example, the download control unit 25 may assign a data file having a large file size to the smartphone 30 having a high communication speed, and a data file having a small file size to the smartphone 30 having a low communication speed. Further, the download control unit 25 may be configured to control an operation adapted to transfer the data file downloaded by the smartphone 30 to the in-vehicle apparatus 10.

The update processing unit 26 may be configured to update the software used in the in-vehicle apparatus 10 by performing the installation operation based on the plurality of data files transferred from the smartphones 30.

Figure 3:
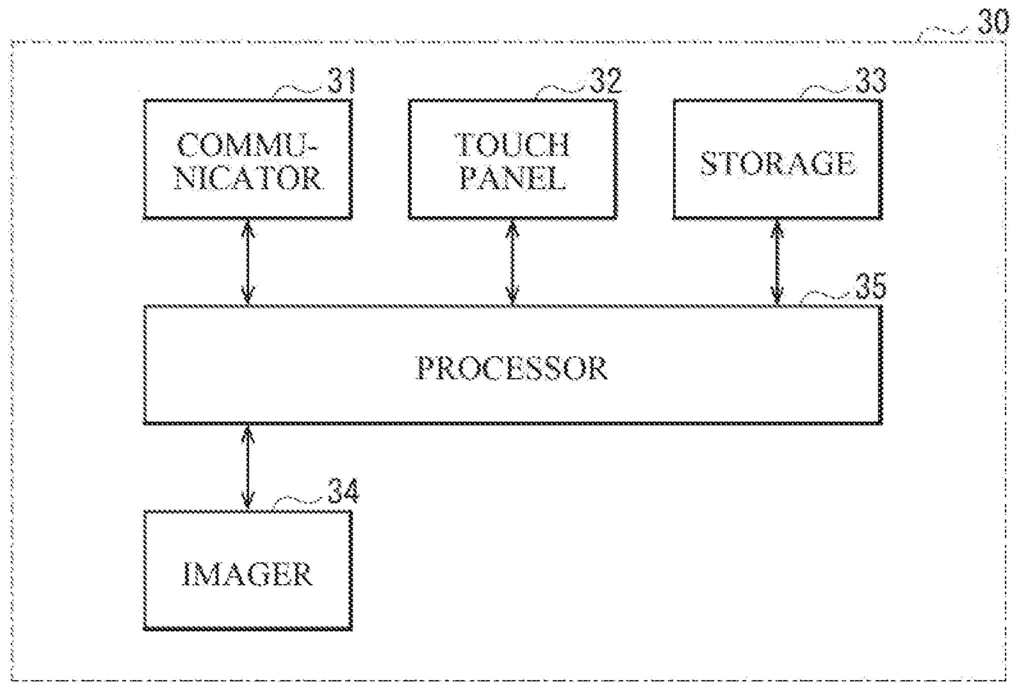
FIG. 3 is a block diagram illustrating a configuration example of a smartphone illustrated in FIG. 1.

FIG. 3 illustrates a configuration example of the smartphone 30. The smartphone 30 may include a communicator 31, a touch panel 32, a storage 33, an imager 34, and a processor 35.

The communicator 31 may include, for example, one or more communication devices. The communicator 31 may be configured to communicate with the server 100 via the Internet (not illustrated) through mobile communication or wireless network communication, for example. The communicator 31 may be further configured to communicate with the in-vehicle apparatus 10 through wireless network communication, for example.

The touch panel 32 may be configured to display information and receive an operational input performed by a user who is the occupant.

The storage 33 may include a non-volatile storage such as a flash memory. The storage 33 may be configured to store software and various kinds of data.

The imager 34 may include a complementary metal-oxide semiconductor (CMOS), for example. The imager 34 may be configured to capture an image of a subject. In this example, the imager 34 may be configured to capture the QR code displayed on the display 12 of the in-vehicle apparatus 10.

The processor 35 may include, for example, one or more processing units and one or more semiconductor memories. The processor 35 may be configured to control an operation of the smartphone 30.

In one embodiment, the communicator 11 may serve as a "communicator". In one embodiment, the processor 20 may serve as a "processor". In one embodiment, the smartphones 30 may serve as "portable devices". In one embodiment, the server 100 may serve as a "server".

Next, operations and workings of the communication system 1 according to the example embodiment are described.

First, an operation of the communication system 1 is described with reference to FIGS. 1 to 3. When the server 100 sends the in-vehicle apparatus 10 the notification indicating that the updating software is in the server 100, the display 12 of the in-vehicle apparatus 10 may display the QR code. For example, each of the smartphones 30 may acquire the connection setting to the server 100 and the connection setting to the in-vehicle apparatus 10 by capturing the QR code in response to an operation of the occupant who is the owner of the smartphone 30, and may establish the communication connection to the in-vehicle apparatus 10 based on the connection setting to the in-vehicle apparatus 10. Further, each of the smartphones 30 may send the in-vehicle apparatus 10 the data on the communication speed of the smartphone 30 in the communication between the smartphone 30 and the server 100. Based on the communication speeds of the smartphones 30, for example, the in-vehicle apparatus 10 may sequentially assign the respective data files included in the updating software to the smartphones 30. The smartphones 30 may each establish the communication connection to the server 100 based on the connection setting to the server 100 and may sequentially download the assigned data files from the server 100. Thereafter, the smartphones 30 may transfer the downloaded data files to the in-vehicle apparatus 10. The in-vehicle apparatus 10 may update the software by performing the installation operation based on the data files transferred from the smartphones 30.

Figure 4:
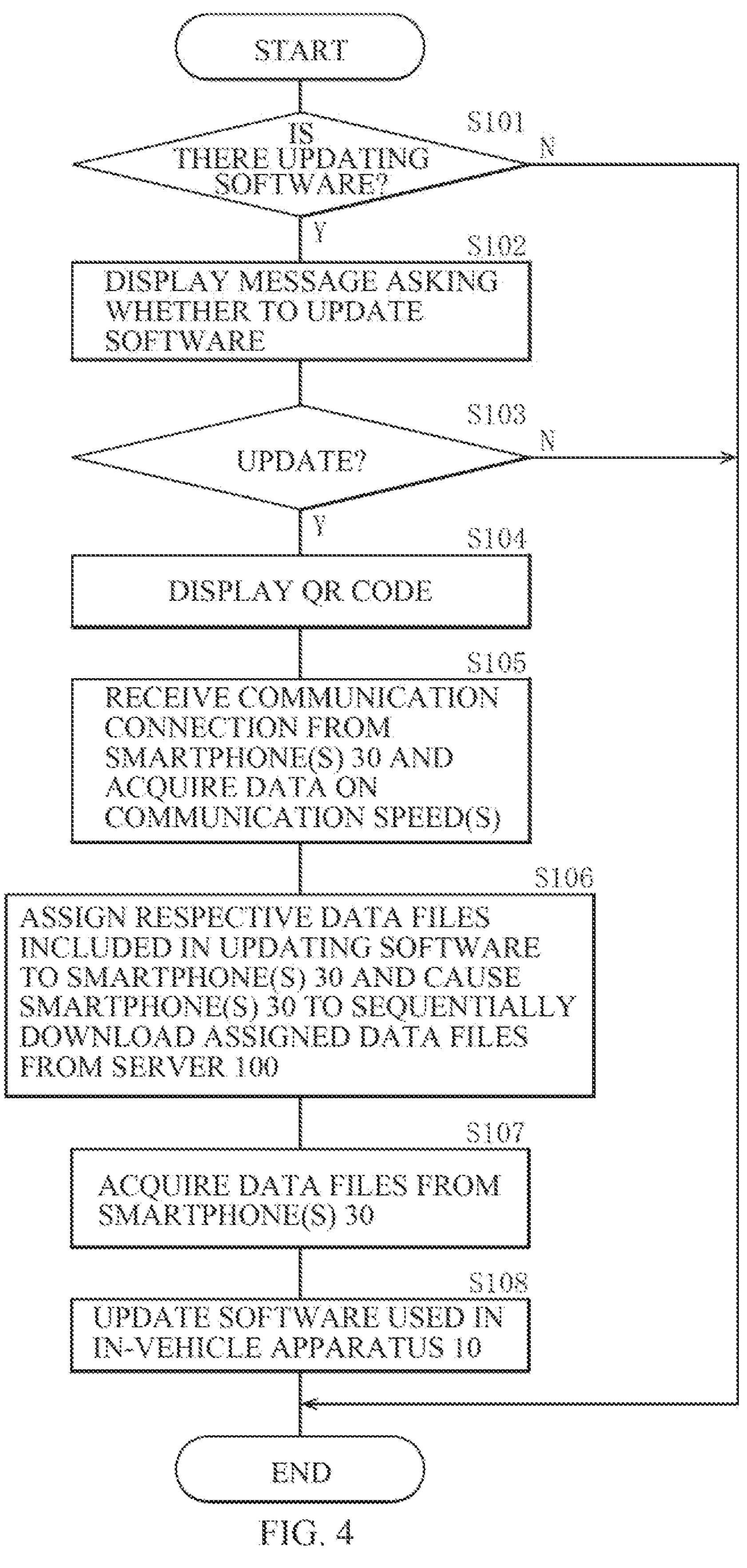
FIG. 4 is a flowchart of an exemplary operation of the in-vehicle apparatus illustrated in FIG. 2.

FIG. 4 illustrates an exemplary operation of the in-vehicle apparatus 10. For example, when the vehicle 9 is started up, the in-vehicle apparatus 10 may perform the following process.

First, the update confirmation unit 22 of the in-vehicle apparatus 10 may confirm whether the notification indicating that the updating software adapted to update the software used in the in-vehicle apparatus 10 is in the server 100 has been received from the server 100 (Step S101). When no updating software is in the server 100 (Step S101: N), the process may be terminated.

When the updating software is in the server 100 (Step S101: Y), the display 12 may display a message asking the occupant whether to update the software used in the in-vehicle apparatus 10, based on a command from the update confirmation unit 22 (Step S102).

When confirming the message displayed on the display 12, the occupant may operate the operation input unit 13 of the in-vehicle apparatus 10 to instruct whether to update the software. When the operation input unit 13 receives an instruction not to update the software (Step S103: N), the process may be terminated.

When the operation input unit 13 receives an instruction to update the software (Step S103: Y), the QR code generation unit 23 may generate the QR code including the data indicating the connection setting to the server 100 and the data indicating the connection setting to the in-vehicle apparatus 10, and the display 12 may display the QR code (Step S104).

When confirming the QR code displayed on the display 12, the occupant may operate the touch panel 32 of the smartphone 30 to capture the QR code. In response to the operation by the occupant, the imager 34 of the smartphone 30 may capture the QR code. When there is one occupant in the vehicle 9, the smartphone 30 of the occupant may capture the QR code, for example. When there are occupants in the vehicle 9, the smartphone 30 of each of the occupants may capture the QR code, for example. The QR code may include the data indicating the connection setting to the server 100 and the data indicating the connection setting to the in-vehicle apparatus 10. Thus, based on the QR code, the processor 35 of the smartphone 30 may acquire the connection setting to the server 100 and the connection setting to the in-vehicle apparatus 10. Thereafter, the communicator 31 of the smartphone 30 may establish the communication connection to the in-vehicle apparatus 10 based on the connection setting to the in-vehicle apparatus 10.

The communication connection management unit 24 may receive the communication connection from the one or more smartphones 30 and may acquire the data on the communication speed of each of the one or more smartphones 30 in the communication with the server 100 (Step S105). Thereafter, the communication connection management unit 24 may manage the smartphone 30 establishing the communication connection to the in-vehicle apparatus 10 in association with the communication speed of the smartphone 30.

Next, the download control unit 25 may sequentially assign the respective data files included in the updating software to the one or more smartphones 30, and may cause the one or more smartphones 30 to sequentially download the assigned date files from the server 100 (Step S106). When the smartphones 30 are communicating with the in-vehicle apparatus 10, the download control unit 25 may assign the respective data files to the smartphones 30 based on the communication speeds of the smartphones 30 acquired in Step S105, for example. The notification which indicates that the updating software is in the server 100 and which is received by the in-vehicle apparatus 10 in Step S101 may include the data on the names of the data files of the updating software and the data on the file sizes of the data files. Based on these pieces of data, the download control unit 25 may assign a data file having a large file size to the smartphone 30 having a high communication speed, and a data file having a small file size to the smartphone 30 having a low communication speed, for example. In this case, the smartphone 30 having the high communication speed may download the data file having the large file size, and the smartphone 30 having the low communication speed may download the data file having the small file size.

Next, the download control unit 25 may cause the one or more smartphones 30 to transfer the plurality of downloaded data files, thereby acquiring the plurality of data files from the one or more smartphones 30 (Step S107). In this way, the in-vehicle apparatus 10 may acquire the updating software.

Thereafter, the update processing unit 26 may update the software used in the in-vehicle apparatus 10 by performing the installation operation based on the data files transferred from the smartphones 30 (Step S108).

Thereafter, the process may be terminated.

Next, an exemplary operation of the communication system 1 is described in detail with reference to some example cases.

Described first is Case C1 in which one smartphone 30 (smartphone 30A) establishes the communication connection to the in-vehicle apparatus 10.

Figure 5A:
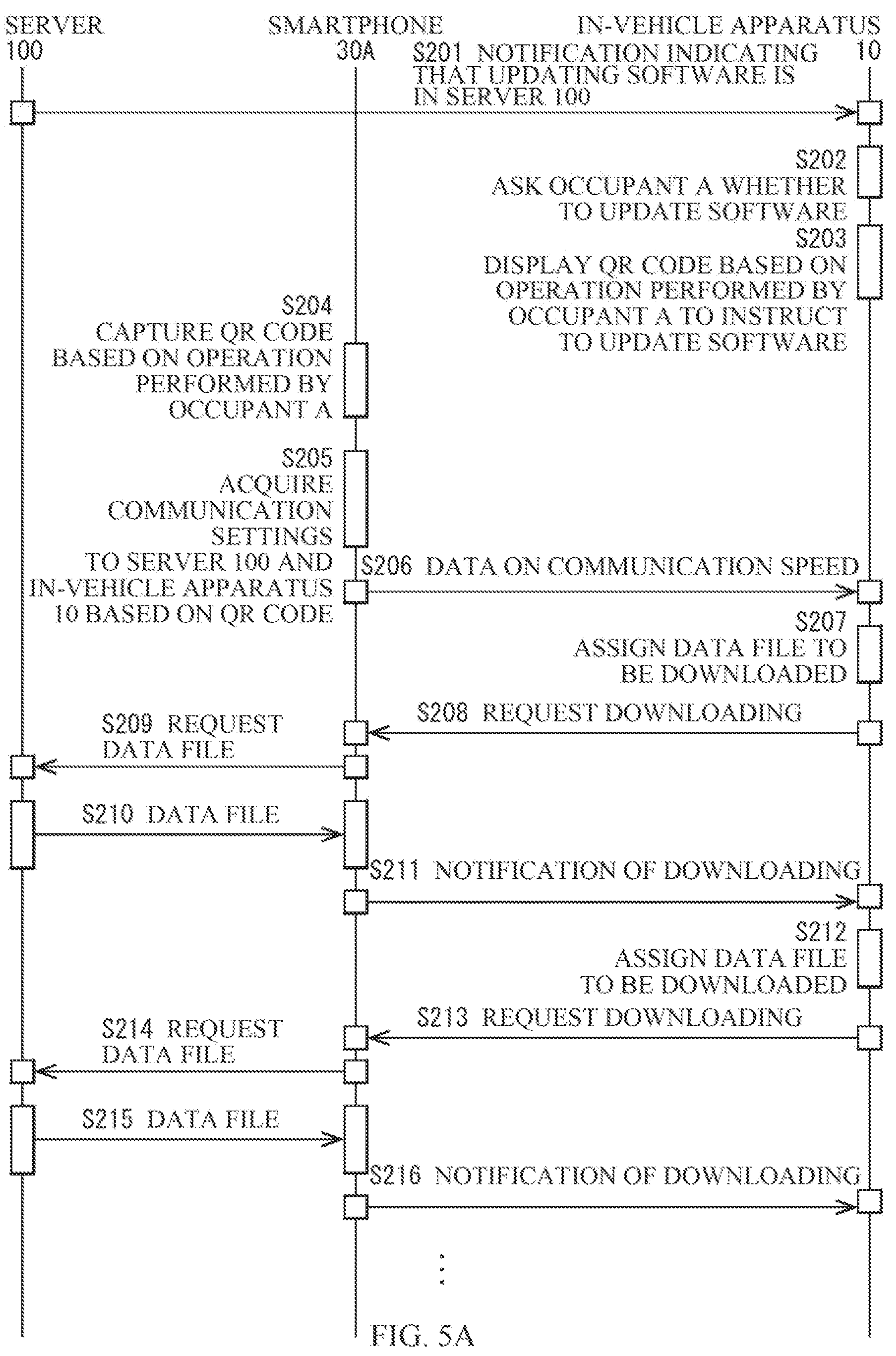
FIG. 5A is a sequence diagram illustrating an exemplary operation of the communication system illustrated in FIG. 1.
Figure 5B:
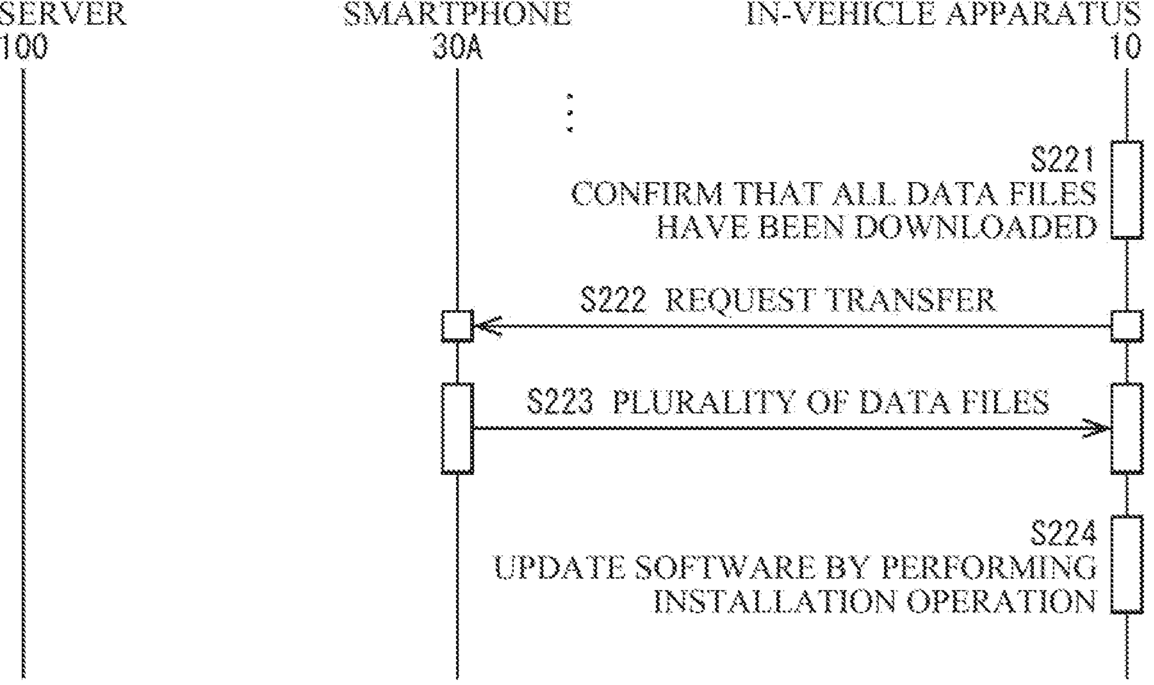
FIG. 5B is another sequence diagram illustrating the exemplary operation of the communication system illustrated in FIG. 1.

FIGS. 5A and 5B each illustrate an exemplary operation of the communication system 1 in Case C1.

First, when the software used in the vehicle 9 is upgraded, for example, the server 100 may send the in-vehicle apparatus 10 the notification indicating that the updating software is in the server 100 (Step S201). The communicator 11 of the in-vehicle apparatus 10 may receive the notification indicating that the updating software is in the server 100, and the update confirmation unit 22 may confirm that the notification has been received.

Next, based on the command from the update confirmation unit 22, the display 12 of the in-vehicle apparatus 10 may display a message asking an occupant A whether to update the software used in the in-vehicle apparatus 10 (Step S202). In this example, the occupant A may perform an operation instructing to update the software using the operation input unit 13 of the in-vehicle apparatus 10. Based on the operation performed by the occupant A to instruct to update the software, the QR code generation unit 23 of the in-vehicle apparatus 10 may generate a QR code, and the display 12 may display the QR code (Step S203).

Based on an operation performed by the occupant A using the touch panel 32 of the smartphone 30A, the imager 34 of the smartphone 30A may capture the QR code displayed on the display 12 of the in-vehicle apparatus 10 (Step S204). Based on the captured QR code, the processor 35 of the smartphone 30A may acquire the connection setting to the server 100 and the connection setting to the in-vehicle apparatus 10 (Step S205). Thereafter, the communicator 31 of the smartphone 30A may establish the communication connection to the in-vehicle apparatus 10 based on the connection setting to the in-vehicle apparatus 10, and may send the data on the communication speed of the smartphone 30A in the communication with the server 100 (Step S206). The communicator 11 of the in-vehicle apparatus 10 may receive the data on the communication speed. The communication connection management unit 24 may manage the smartphone 30A in association with the communication speed of the smartphone 30A.

Next, the download control unit 25 of the in-vehicle apparatus 10 may assign one of the data files included in the updating software to the smartphone 30A (Step S207). Thereafter, the in-vehicle apparatus 10 may request the smartphone 30A to download the assigned data file (Step S208).

The smartphone 30A may establish the communication connection to the server 100 based on the connection setting to the server 100 and may request the server 100 to transmit the assigned data file (Step S209). In response to the request from the smartphone 30A, the server 100 may transmit the data file assigned to the smartphone 30A (Step S210). In this way, the smartphone 30A may download the data file assigned in Step S207 from the server 100. Thereafter, the smartphone 30A may send the in-vehicle apparatus 10 a notification indicating that the assigned data file has been downloaded (Step S211).

The communication system 1 may repeat the process from Step S207 to Step S211 until the smartphone 30A downloads all the data files included in the updating software (see Steps S212 to S216, for example).

Thereafter, the download control unit 25 of the in-vehicle apparatus 10 may confirm that the smartphone 30A has downloaded all the data files included in the updating software (Step S221). Thereafter, the download control unit 25 may request the smartphone 30A to transfer all the downloaded data files (Step S222). In response to the request from the in-vehicle apparatus 10, the smartphone 30A may transfer all the downloaded data files to the in-vehicle apparatus 10 (Step S223). The communicator 11 of the in-vehicle apparatus 10 may receive these data files.

Thereafter, the update processing unit 26 of the in-vehicle apparatus 10 may update the software used in the in-vehicle apparatus 10 by performing the installation operation based on the data files transferred from the smartphone 30A (Step S224).

Thereafter, the process may be terminated.

Described next is Case C2 in which two smartphones 30 (smartphones 30A and 30B) establish the communication connection to the in-vehicle apparatus 10 at substantially the same time.

Figure 6A:
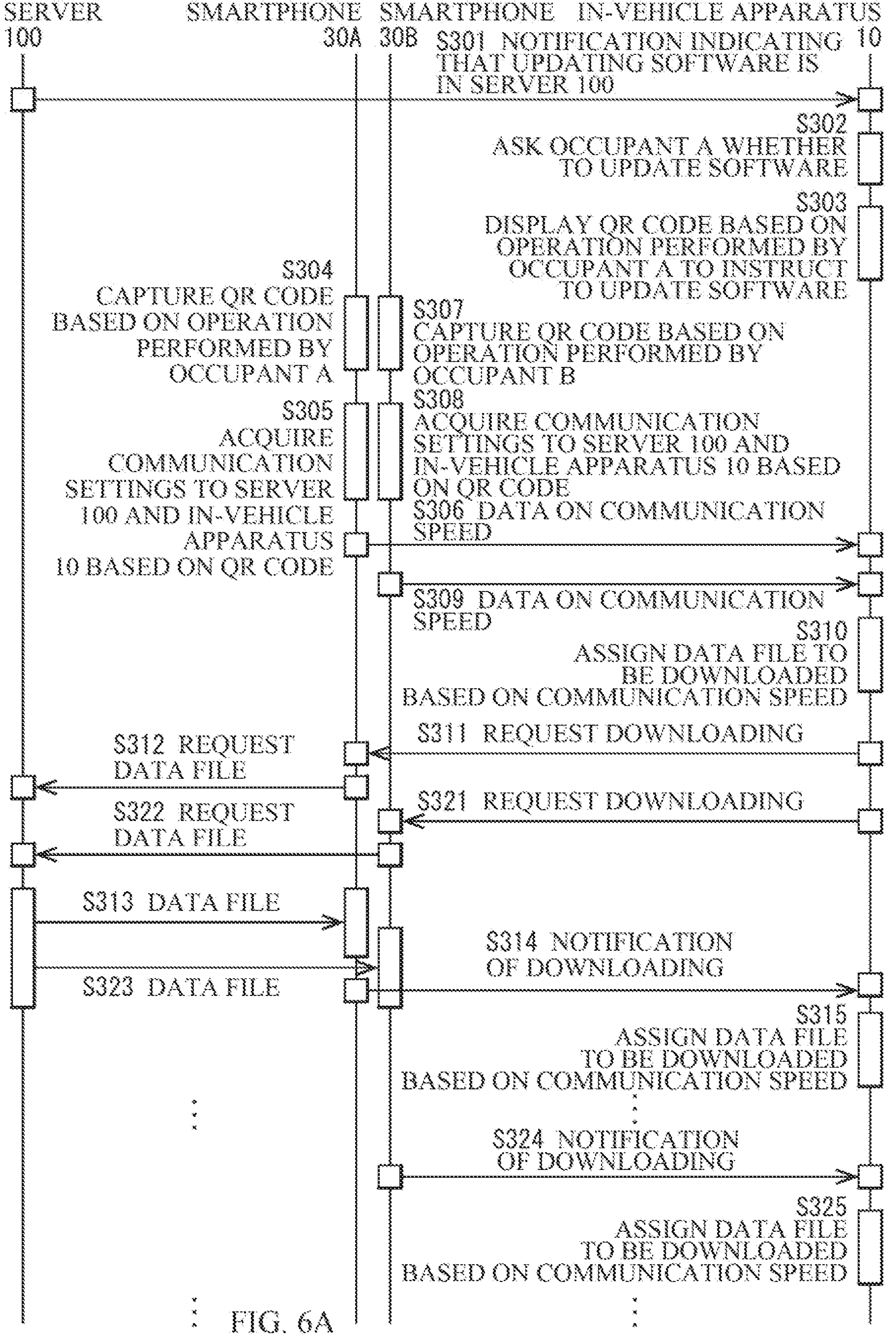
FIG. 6A is another sequence diagram illustrating an exemplary operation of the communication system illustrated in FIG. 1.
Figure 6B:
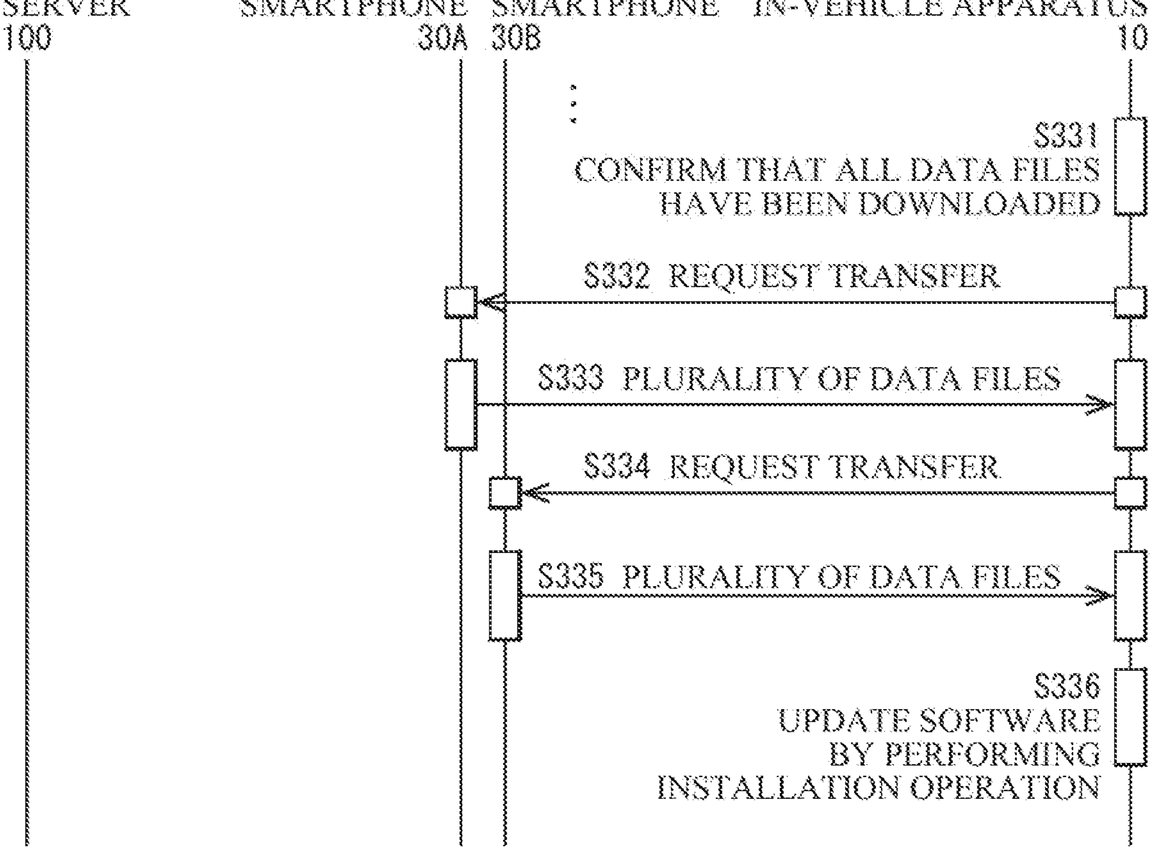
FIG. 6B is another sequence diagram illustrating an exemplary operation of the communication system illustrated in FIG. 1.

FIGS. 6A and 6B each illustrate an exemplary operation of the communication system 1 in Case C2.

First, when the software used in the vehicle 9 is upgraded, for example, the server 100 may send the in-vehicle apparatus 10 the notification indicating that the updating software is in the server 100 (Step S301). The communicator 11 of the in-vehicle apparatus 10 may receive the notification indicating that the updating software is in the server 100, and the update confirmation unit 22 may confirm that the notification has been received.

Next, based on the command from the update confirmation unit 22, the display 12 of the in-vehicle apparatus 10 may display the message asking the occupant A whether to update the software used in the in-vehicle apparatus 10 (Step S302). In this example, the occupant A may perform the operation instructing to update the software using the operation input unit 13 of the in-vehicle apparatus 10. Based on the operation performed by the occupant A to instruct to update the software, the QR code generation unit 23 of the in-vehicle apparatus 10 may generate a QR code, and the display 12 may display the QR code (Step S303).

Based on the operation performed by the occupant A using the touch panel 32 of the smartphone 30A, the imager 34 of the smartphone 30A may capture the QR code displayed on the display 12 of the in-vehicle apparatus 10 (Step S304). Based on the captured QR code, the processor 35 of the smartphone 30A may acquire the connection setting to the server 100 and the connection setting to the in-vehicle apparatus 10 (Step S305). Thereafter, the communicator 31 of the smartphone 30A may establish the communication connection to the in-vehicle apparatus 10 based on the connection setting to the in-vehicle apparatus 10, and may send the data on the communication speed of the smartphone 30A in the communication with the server 100 (Step S306). The communicator 11 of the in-vehicle apparatus 10 may receive the data on the communication speed. The communication connection management unit 24 may manage the smartphone 30A in association with the communication speed of the smartphone 30A.

Likewise, based on an operation performed by an occupant B using the touch panel 32 of the smartphone 30B, the imager 34 of the smartphone 30B may capture the QR code displayed on the display 12 of the in-vehicle apparatus 10 (Step S307). Based on the captured QR code, the processor 35 of the smartphone 30B may acquire the connection setting to the server 100 and the connection setting to the in-vehicle apparatus 10 (Step S308). Thereafter, the communicator 31 of the smartphone 30B may establish the communication connection to the in-vehicle apparatus 10 based on the connection setting to the in-vehicle apparatus 10, and may send the data on the communication speed of the smartphone 30B in the communication with the server 100 (Step S309). The communicator 11 of the in-vehicle apparatus 10 may receive the data on the communication speed. The communication connection management unit 24 may manage the smartphone 30B in association with the communication speed of the smartphone 30B.

Next, the download control unit 25 of the in-vehicle apparatus 10 may assign one of the data files included in the updating software to each of the smartphones 30A and 30B based on the communication speeds of the smartphones 30A and 30B (Step S310). When the communication speed of the smartphone 30A is higher than that of the smartphone 30B, for example, the download control unit 25 may assign a data file having a large file size to the smartphone 30A, and a data file having a small file size to the smartphone 30B. Thereafter, the in-vehicle apparatus 10 may request the smartphone 30A to download the assigned data file (Step S311) and may request the smartphone 30B to download the assigned data file (Step S321).

The smartphone 30A may establish the communication connection to the server 100 based on the connection setting to the server 100 and may request the server 100 to transmit the assigned data file (Step S312). In response to the request from the smartphone 30A, the server 100 may transmit the assigned data file to the smartphone 30A (Step S313). In this way, the smartphone 30A may download the data file assigned in Step S310 from the server 100. Thereafter, the smartphone 30A may send the in-vehicle apparatus 10 the notification indicating that the assigned data file has been downloaded (Step S314).

Likewise, the smartphone 30B may establish the communication connection to the server 100 based on the connection setting to the server 100 and may request the server 100 to transmit the assigned data file (Step S322). In response to the request from the smartphone 30B, the server 100 may transmit the assigned data file to the smartphone 30B (Step S323). In this way, the smartphone 30B may download the data file assigned in Step S310 from the server 100. Thereafter, the smartphone 30B may send the in-vehicle apparatus 10 the notification indicating that the assigned data file has been downloaded (Step S324).

The communication system 1 may repeat the process described above until the smartphones 30A and 30B download all the data files included in the updating software (see Steps S315 and S325, for example). When the communication speed of the smartphone 30A is higher than that of the smartphone 30B in this process, for example, a data file having a large file size may be assigned to the smartphone 30A, and a data file having a small file size may be assigned to the smartphone 30B. Accordingly, the smartphone 30A may download the data file having the large file size, and the smartphone 30B may download the data file having the small file size, for example.

Thereafter, the download control unit 25 of the in-vehicle apparatus 10 may confirm that the smartphones 30A and 30B have downloaded all the data files included in the updating software (Step S331).

Thereafter, the download control unit 25 may request the smartphone 30A to transfer all the downloaded data files (step S332). In response to the request from the in-vehicle apparatus 10, the smartphone 30A may transfer all the downloaded data files to the in-vehicle apparatus 10 (Step S333). The communicator 11 of the in-vehicle apparatus 10 may receive these data files.

Likewise, the download control unit 25 may request the smartphone 30B to transfer all the downloaded data files (Step S334). In response to the request from the in-vehicle apparatus 10, the smartphone 30B may transfer all the downloaded data files to the in-vehicle apparatus 10 (Step S335). The communicator 11 of the in-vehicle apparatus 10 may receive these data files.

Thereafter, the update processing unit 26 of the in-vehicle apparatus 10 may update the software used in the in-vehicle apparatus 10 by performing the installation operation based on the data files transferred from the smartphones 30A and 30B (Step S336).

Thereafter, the process may be terminated. In one embodiment, the smartphone 30A may serve as the "first portable device". In one embodiment, the smartphone 30B may serve as a "second portable device".

Described next is Case C3 in which two smartphones 30 (smartphones 30A and 30B) establish the communication connection to the in-vehicle apparatus 10. In this example, the smartphone 30A may establish the communication connection first, following which the smartphone 30B may establish the communication connection.

Figure 7A:
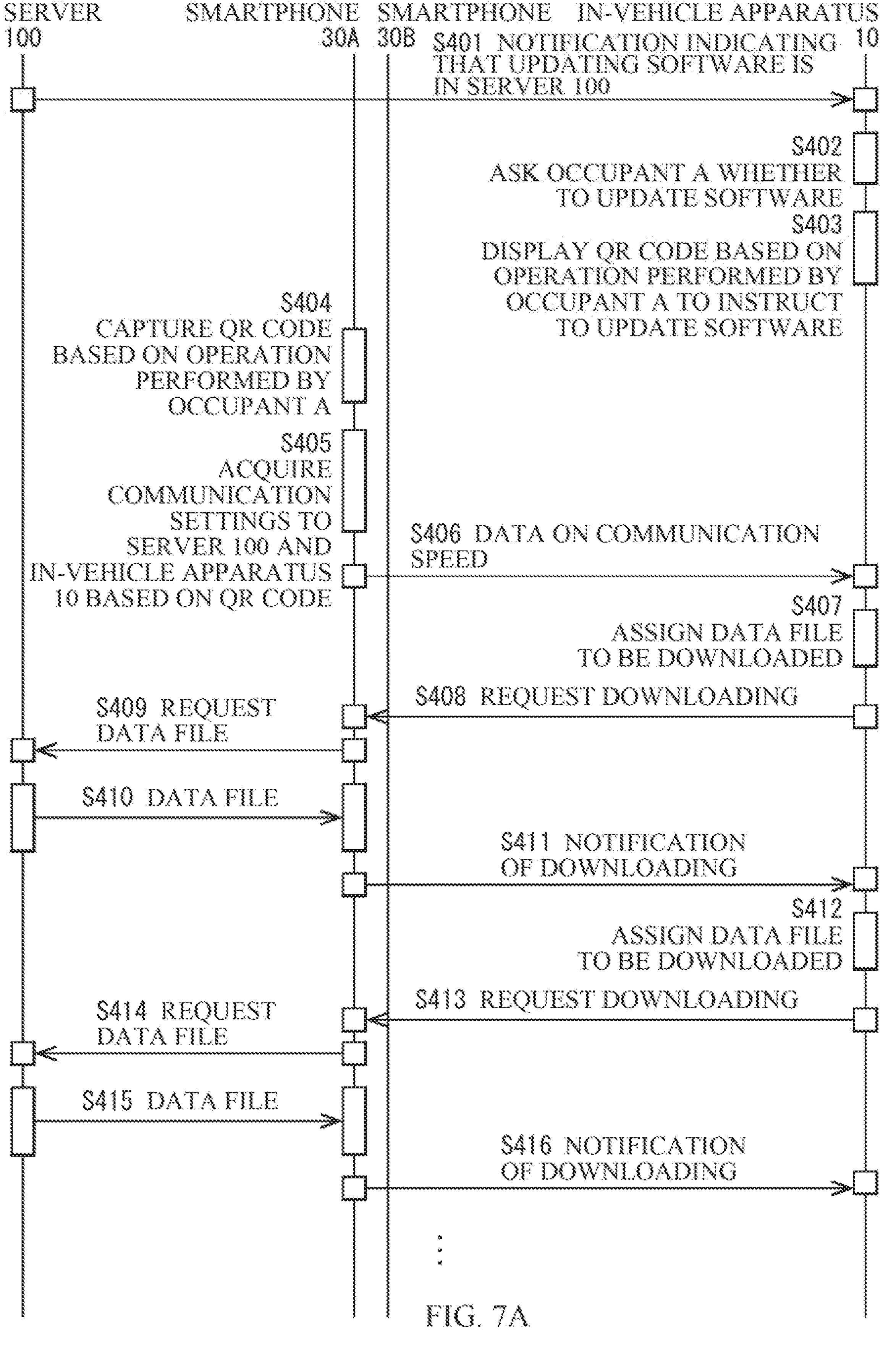
FIG. 7A is another sequence diagram illustrating an exemplary operation of the communication system illustrated in FIG. 1.
Figure 7B:
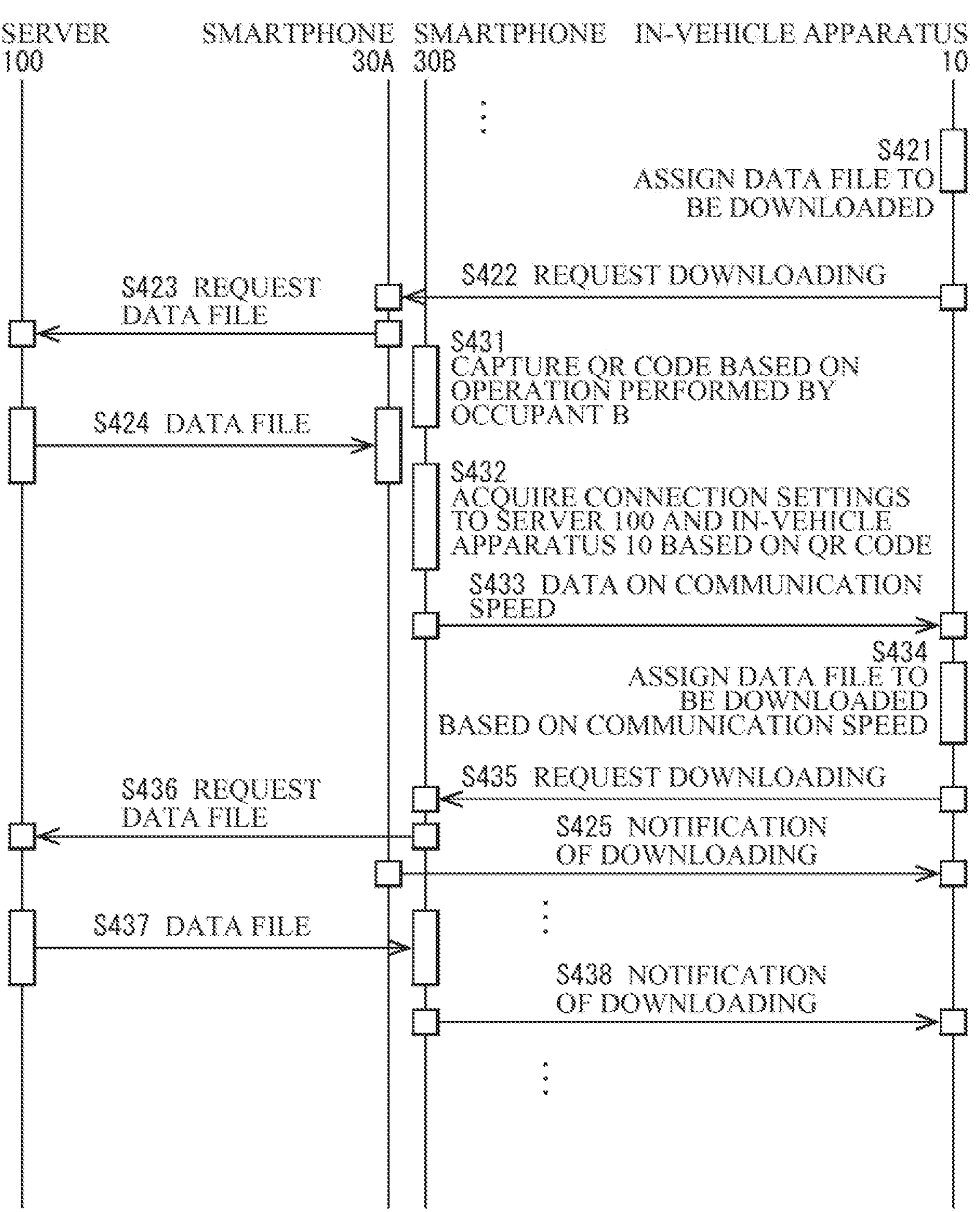
FIG. 7B is another sequence diagram illustrating an exemplary operation of the communication system illustrated in FIG. 1.
Figure 7C:
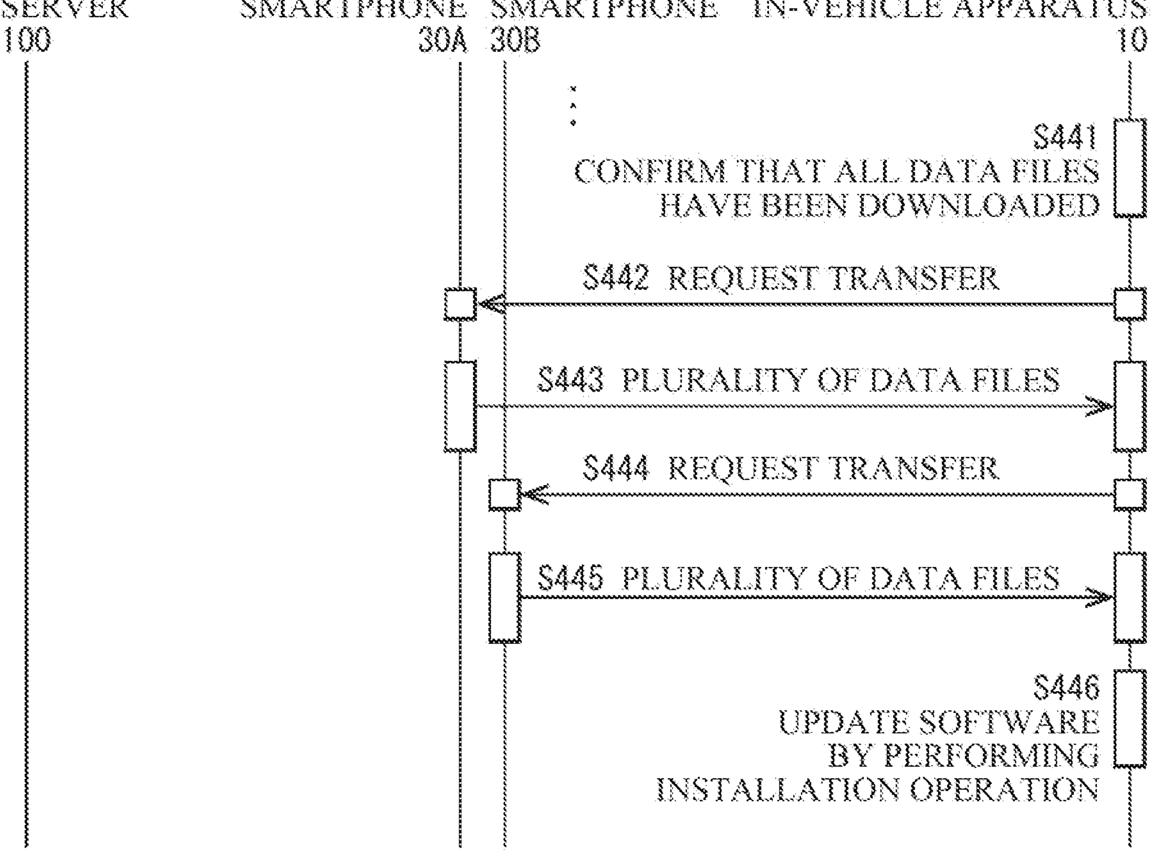
FIG. 7C is another sequence diagram illustrating an exemplary operation of the communication system illustrated in FIG. 1.

FIGS. 7A and 7B each illustrate an exemplary operation of the communication system 1 in Case C3.

First, when the software used in the vehicle 9 is upgraded, for example, the server 100 may send the in-vehicle apparatus 10 the notification indicating that the updating software is in the server 100 (Step S401). The communicator 11 of the in-vehicle apparatus 10 may receive the notification indicating that the updating software is in the server 100, and the update confirmation unit 22 may confirm that the notification has been received.

Next, based on the command from the update confirmation unit 22, the display 12 of the in-vehicle apparatus 10 may display the message asking the occupant A whether to update the software used in the in-vehicle apparatus 10 (Step S402). In this example, the occupant A may perform the operation instructing to update the software using the operation input unit 13 of the in-vehicle apparatus 10. Based on the operation performed by the occupant A to instruct to update the software, the QR code generation unit 23 of the in-vehicle apparatus 10 may generate a QR code, and the display 12 may display the QR code (Step S403).

Based on the operation performed by the occupant A using the touch panel 32 of the smartphone 30A, and the imager 34 of the smartphone 30A may capture the QR code displayed on the display 12 of the in-vehicle apparatus 10 (Step S404). Based on the captured QR code, the processor 35 of the smartphone 30A may acquire the connection setting to the server 100 and the connection setting to the in-vehicle apparatus 10 (Step S405). Thereafter, the communicator 31 of the smartphone 30A may establish the communication connection to the in-vehicle apparatus 10 based on the connection setting to the in-vehicle apparatus 10, and may send the data on the communication speed of the smartphone 30A in the communication with the server 100 (Step S406). The communicator 11 of the in-vehicle apparatus 10 may receive the data on the communication speed. The communication connection management unit 24 may manage the smartphone 30A in association with the communication speed of the smartphone 30A.

Next, the download control unit 25 of the in-vehicle apparatus 10 may assign one of the data files included in the updating software to the smartphone 30A (Step S407). Thereafter, the in-vehicle apparatus 10 may request the smartphone 30A to download the assigned data file (Step S408).

The smartphone 30A may establish the communication connection to the server 100 based on the connection setting to the server 100 and may request the server 100 to transmit the assigned data file (Step S409). In response to the request from the smartphone 30A, the server 100 may transmit the assigned data file to the smartphone 30A (Step S410). In this way, the smartphone 30A may download the data file assigned in Step S407 from the server 100. Thereafter, the smartphone 30A may send the in-vehicle apparatus 10 the notification indicating that the assigned data file has been downloaded (Step S411).

In this example, the communication system 1 may repeat the process including Step S407 to Step S411 at least once (see Step S412 to Step S416, for example).

Thereafter, since the smartphone 30A has not downloaded all the data files included in the updating software yet, the download control unit 25 of the in-vehicle apparatus 10 may assign one of the data files included in the updating software to the smartphone 30A (Step S421). Thereafter, the in-vehicle apparatus 10 may request the smartphone 30A to download the assigned data file (Step S422). The smartphone 30A may establish the communication connection to the server 100 based on the connection setting to the server 100 and may request the server 100 to transmit the assigned data file (Step S423). In response to the request from the smartphone 30A, the server 100 may transmit the assigned data file to the smartphone 30A (Step S424). Thereafter, the smartphone 30A may send the in-vehicle apparatus 10 the notification indicating that the assigned data file has been downloaded (Step S425).

In this example, the occupant B may start operating the smartphone 30B when the smartphone 30A is downloading the data file in Step S424. Based on the operation performed by the occupant B using the touch panel 32 of the smartphone 30B, the imager 34 of the smartphone 30B may capture the QR code displayed on the display 12 of the in-vehicle apparatus 10 (Step S431). Based on the captured QR code, the processor 35 of the smartphone 30B may acquire the connection setting to the server 100 and the connection setting to the in-vehicle apparatus 10 (Step S432). Thereafter, the communicator 31 of the smartphone 30B may establish the communication connection to the in-vehicle apparatus 10 based on the connection setting to the in-vehicle apparatus 10, and may send the data on the communication speed of the smartphone 30B in the communication with the server 100 (Step S433). The communicator 11 of the in-vehicle apparatus 10 may receive the data on the communication speed. The communication connection management unit 24 may manage the smartphone 30B in association with the communication speed of the smartphone 30B.

Next, the download control unit 25 of the in-vehicle apparatus 10 may assign one of the data files included in the updating software to the smartphone 30B based on the communication speeds of the smartphone 30A and the smartphone 30B (Step S434). When the communication speed of the smartphone 30B is lower than that of the smartphone 30A, for example, the download control unit 25 may assign a data file having a small file size to the smartphone 30B. Thereafter, the in-vehicle apparatus 10 may request the smartphone 30B to download the assigned data file (Step S435).

The smartphone 30B may establish the communication connection to the server 100 based on the connection setting to the server 100 and may request the server 100 to transmit the assigned data file (Step S436). In response to the request from the smartphone 30B, the server 100 may transmit the assigned data file to the smartphone 30B (Step S437). In this way, the smartphone 30B may download the data file assigned in Step S434 from the server 100. Thereafter, the smartphone 30B may send the in-vehicle apparatus 10 the notification indicating that the assigned data file has been downloaded (Step S438).

The communication system 1 may repeat the process described above. When the communication speed of the smartphone 30A is higher than that of the smartphone 30B in this process, for example, a data file having a large file size may be assigned to the smartphone 30A, and a data file having a small file size may be assigned to the smartphone 30B. Accordingly, the smartphone 30A may download the data file having the large file size, and the smartphone 30B may download the data file having the small file size, for example.

Thereafter, the download control unit 25 of the in-vehicle apparatus 10 may confirm that the smartphones 30A and 30B have downloaded all the data files included in the updating software (Step S441).

Thereafter, the download control unit 25 may request the smartphone 30A to transfer all the downloaded data files (Step S442). In response to the request from the in-vehicle apparatus 10, the smartphone 30A may transfer all the downloaded data files to the in-vehicle apparatus 10 (Step S443). The communicator 11 of the in-vehicle apparatus 10 may receive these data files.

Likewise, the download control unit 25 may request the smartphone 30B to transfer all the downloaded data files (Step S444). In response to the request from the in-vehicle apparatus 10, the smartphone 30B may transfer all the downloaded data files to the in-vehicle apparatus 10 (Step S445). The communicator 11 of the in-vehicle apparatus 10 may receive these data files.

Thereafter, the update processing unit 26 of the in-vehicle apparatus 10 may update the software used in the in-vehicle apparatus 10 by performing the installation operation based on the data files transferred from the smartphones 30A and 30B (Step S446).

Thereafter, the process may be terminated. In one embodiment, the smartphone 30A may serve as the "first portable device". In one embodiment, the smartphone 30B may serve as the "second portable device".

As described above, the in-vehicle apparatus 10 includes the communicator 11 and the processor 20. The communicator 11 is configured to communicate with the smartphones 30. The processor 20 is configured to acquire the speed datasets on each communication speed between the smartphone 30 and the server 100 from each of the smartphones 30 communicably coupled to the communicator 11. The processor 20 is further configured to assign the respective data files to be downloaded from the server 100 to the smartphones 30 based on the speed datasets. The processor 20 is further configured to request each of the smartphones 30 to download the assigned data file from the server 100. In this way, the software may be downloaded by the smartphones 30. This reduces a load on each of the smartphones 30, enabling the software to be downloaded in a shorter time. Further, the respective data files may be assigned to the smartphones 30 in accordance with the communication speeds of the smartphones 30. For example, a data file having a large file size may be assigned to the smartphone 30 having a high communication speed. It is therefore possible for the in-vehicle apparatus 10 to achieve effective downloading in a short time.

Further, the processor 20 of the in-vehicle apparatus 10 may be configured to assign a first data file having a first file size to the smartphone 30A among the smartphones 30, and assign a second data file having a second file size to the smartphone 30B among the smartphones 30. The smartphone 30A may be configured to communicate with the server 100 at a first communication speed. The smartphone 30B may be configured to communicate with the server 100 at a second communication speed. The second file size may be smaller than the first file size. The second communication speed may be lower than the first communication speed. This achieves full use of the smartphone 30A having a high communication speed, and the use of the smartphone 30B having a low communication speed in addition to the smartphone 30A reduces a load on each of the smartphones 30. It is therefore possible for the in-vehicle apparatus 10 to achieve effective downloading in a short time.

Further, according to the in-vehicle apparatus 10 of the example embodiment described above, the communication speed indicated by each of the speed datasets may be the actual communication speed obtained upon the actual communication between the smartphone 30 and the server 100. The speed of wireless communication can vary depending on various conditions such as a position of the vehicle 9 or the number of wireless devices located near the vehicle 9; however, the in-vehicle apparatus 10 may be configured to assign the respective data files based on actual current communication speeds. It is therefore possible for the in-vehicle apparatus 10 to achieve effective downloading in a short time in accordance with a current condition.

Further, according to the in-vehicle apparatus 10 of the example embodiment described above, the communication speed indicated by each of the speed datasets may be the communication speed estimated based on the standard of the wireless communication to be used in the communication between the smartphone 30 and the server 100. The standard of the wireless communication can affect the speed of the communication between the smartphone 30 and the server 100. The in-vehicle apparatus 10 may thus estimate the communication speed based on the standard of the wireless communication. This enables the communication speed to be acquired in a relatively simple way, and enables the respective data files to be assigned based on the communication speeds. It is therefore possible to achieve effective downloading in a short time.

Further, according to the in-vehicle apparatus 10 of the example embodiment described above, the communicator 11 may be configured to receive the data files downloaded from the server 100 and transmitted from the smartphones 30 communicably coupled to the communicator 11. This enables the in-vehicle apparatus 10 to update the software based on the downloaded data files. It is therefore possible for the in-vehicle apparatus 10 to achieve effective software updating by effectively downloading the data files in a short time.

[Effects]

According to the example embodiment described above, the in-vehicle apparatus 10 includes the communicator, and the processor. The communicator is configured to communicate with the smartphones. The processor is configured to acquire the speed datasets, each of the speed datasets indicating the communication speed between the smartphone and the server from each of the smartphones communicably coupled to the communicator. The processor is further configured to assign the respective data files to be downloaded from the server to the smartphones based on the speed datasets. The processor is further configured to request each of the smartphones to download the assigned data file from the server. It is therefore possible for the in-vehicle apparatus 10 to achieve effective downloading in a short time.

According to the example embodiment described above, the processor may be configured to assign the first data file having the first file size to the smartphone configured to communicate with the server at the first communication speed among the smartphones, and assign the second data file having the second file size to the smartphone configured to communicate with the server at the second communication speed among the smartphones. The second file size may be smaller than the first file size, and the second communication speed may be lower than the first communication speed. It is therefore possible for the in-vehicle apparatus to achieve effective downloading in a short time.

According to the example embodiment described above, the communication speed indicated by each of the speed datasets may be the actual communication speed obtained upon the communication between the smartphone and the server. It is therefore possible for the in-vehicle apparatus to achieve effective downloading in a short time.

According to the example embodiment described above, the communication speed indicated by each of the speed datasets may be the communication speed estimated based on the standard of the wireless communication to be used in the communication between the smartphone and the server. It is therefore possible for the in-vehicle apparatus to achieve effective downloading in a short time.

According to the example embodiment described above, the communicator may be configured to receive the data files downloaded from the server and transmitted from the smartphones communicably coupled to the communicator. This enables the in-vehicle apparatus to update the software based on the downloaded data files. It is therefore possible for the in-vehicle apparatus to achieve effective software updating by effectively downloading the data files.

Figure 8:
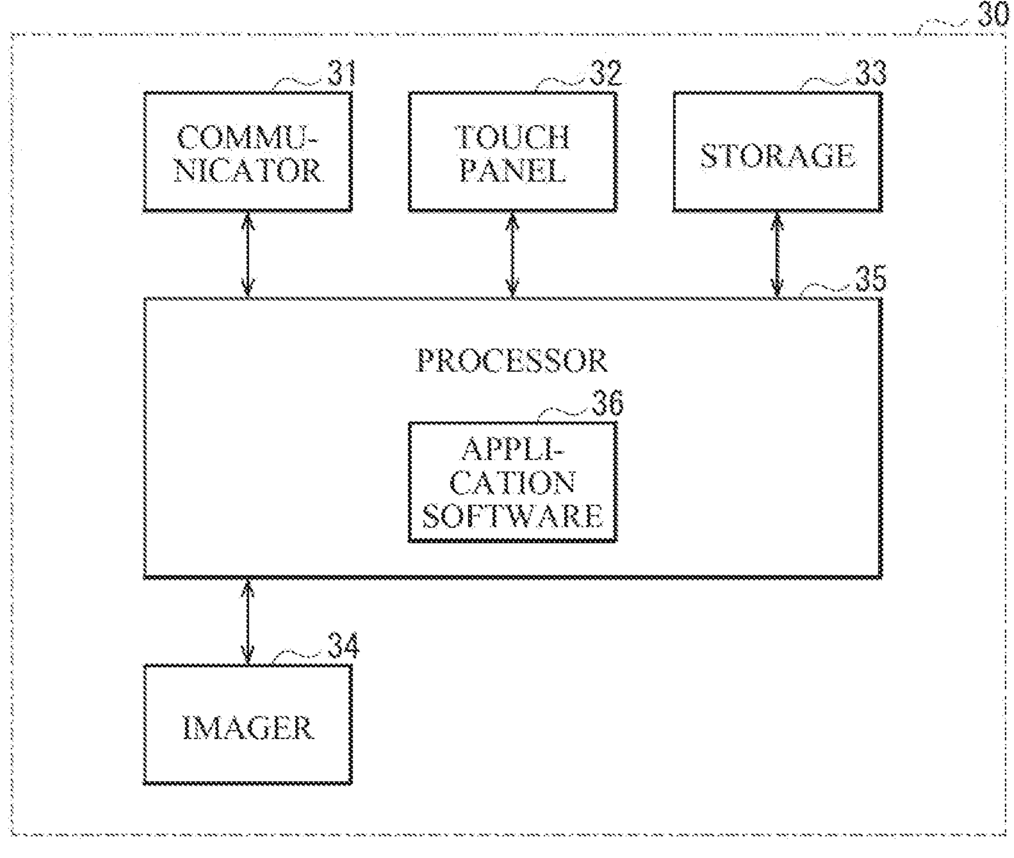
FIG. 8 is a block diagram illustrating a configuration example of a smartphone according to one example embodiment of the disclosure.

In the example embodiment described above, the smartphone 30 may capture the QR code, acquire the connection setting to the server 100 and the connection setting to the in-vehicle apparatus 10 based on the captured QR code, and establish the communication connection based on these connection settings; however, the disclosure is not limited thereto. For example, as illustrated in FIG. 8, the processor 35 may execute application software 36 installed in advance in the smartphone 30 to establish the communication connection based on the connection setting to the server 100 and the connection setting to the in-vehicle apparatus 10 that are set to the application software 36.

In Modification Example 1, the smartphone 30 may be configured to acquire the connection setting to the server 100 and the connection setting to the in-vehicle apparatus 10 by two methods. That is, when the QR code is displayed on the display 12 of the in-vehicle apparatus 10, the smartphone 30 may acquire the connection setting to the server 100 and the connection setting to the in-vehicle apparatus 10 by capturing the QR code in response to the operation performed by the occupant, as in the example embodiment described above. Alternatively, the smartphone 30 may acquire the connection setting to the server 100 and the connection setting to the in-vehicle apparatus 10 by executing the application software 36 based on the operation performed by the occupant.

In the example embodiment described above, the processor 20 may control the travel of the vehicle 9; however, the disclosure is not limited thereto. Alternatively, the processor 20 may perform another process related to the vehicle 9. For example, the processor 20 may determine a route to a destination on which the vehicle 9 is to travel, and may perform a navigation process in which information on the route is provided to the driver who drives the vehicle 9. In this case, the in-vehicle apparatus 10 may be configured to update software related to the navigation process.

In the example embodiment described above, the QR code may include the data indicating the connection setting to the server 100 and the data indicating the connection setting to the in-vehicle apparatus 10; however, the disclosure is not limited thereto. Alternatively, the QR code may include, for example, the data indicating the connection setting to the server 100 and may not include the data indicating the connection setting to the in-vehicle apparatus 10. In this case, the occupant may communicably couple the smartphone 30 to the in-vehicle apparatus 10 by manually inputting the identifier of the in-vehicle apparatus 10, for example. For instance, the in-vehicle apparatus 10 may sequentially assign the respective data files included in the updating software to the smartphones 30 that have acquired the connection settings to the server 100 from the QR code among the one or more smartphones 30 communicably coupled to the in-vehicle apparatus 10.

In the example embodiment described above, the smartphone 30 in which the software is to be downloaded may be designated by the occupant operating the smartphone 30; however, the disclosure is not limited thereto. Alternatively, according to Modification Example 4, the smartphone in which the software is to be downloaded may be the smartphone 30 communicably coupled to the in-vehicle apparatus, for example. Details of the modification example are described below.

Figure 9:
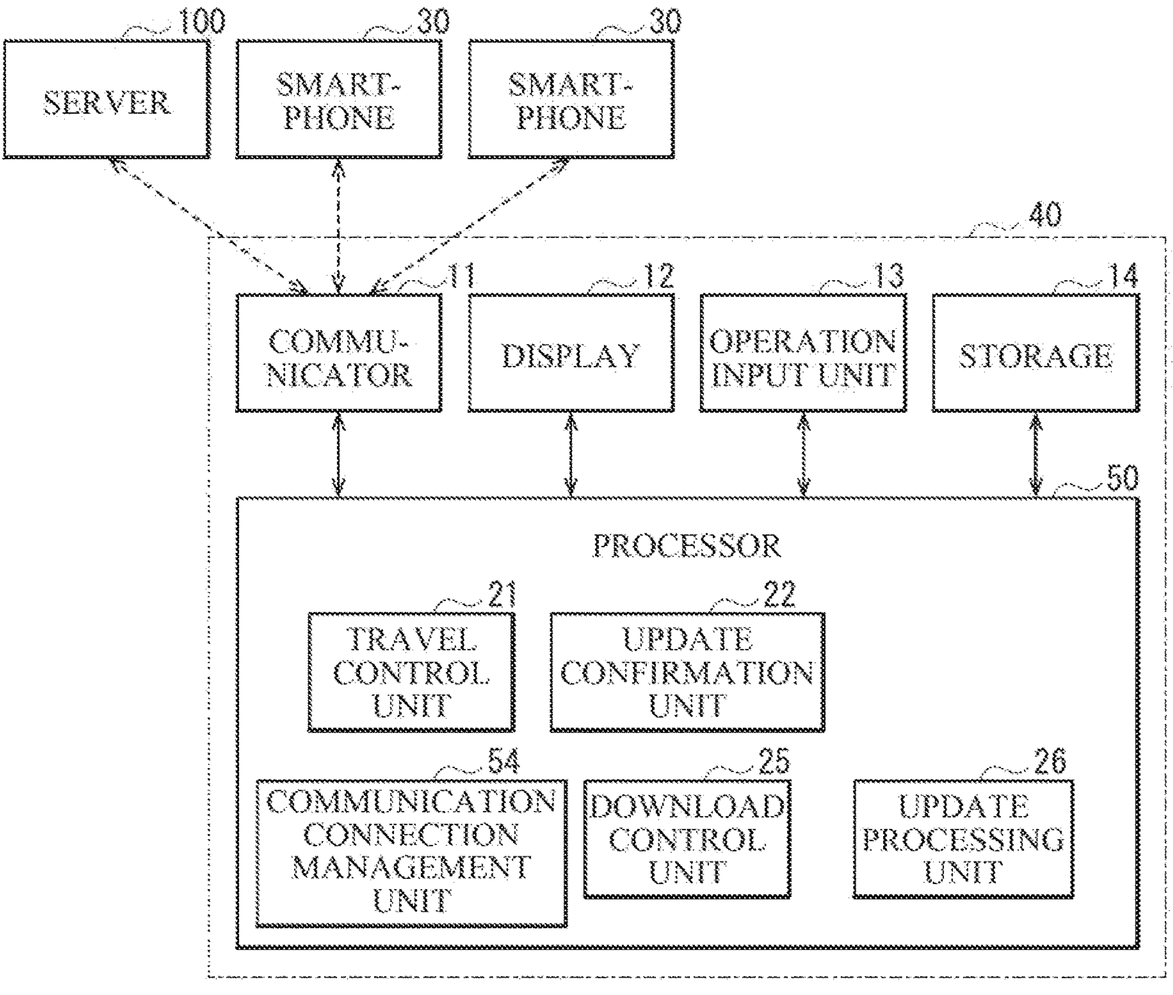
FIG. 9 is a block diagram illustrating a configuration example of the in-vehicle apparatus according to one example embodiment of the disclosure.

FIG. 9 illustrates a configuration example of an in-vehicle apparatus 40 according to Modification Example 4. The in-vehicle apparatus 40 may include a processor 50. The processor 50 may include the travel control unit 21, the update confirmation unit 22, a communication connection management unit 54, the download control unit 25, and the update processing unit 26. The communication connection management unit 54 may be configured to manage the communication connection of the smartphone 30 to the in-vehicle apparatus 40. For example, the communication connection management unit 54 may be configured to manage the smartphone 30 establishing the communication connection to the in-vehicle apparatus 40 in association with the communication speed of the smartphone 30 in the communication between the smartphone 30 and the server 100. In this example, the smartphone 30 may be registered in advance to the communication connection management unit 54. The communication connection management unit 54 may be further configured to manage the smartphone 30 registered.

Figure 10:
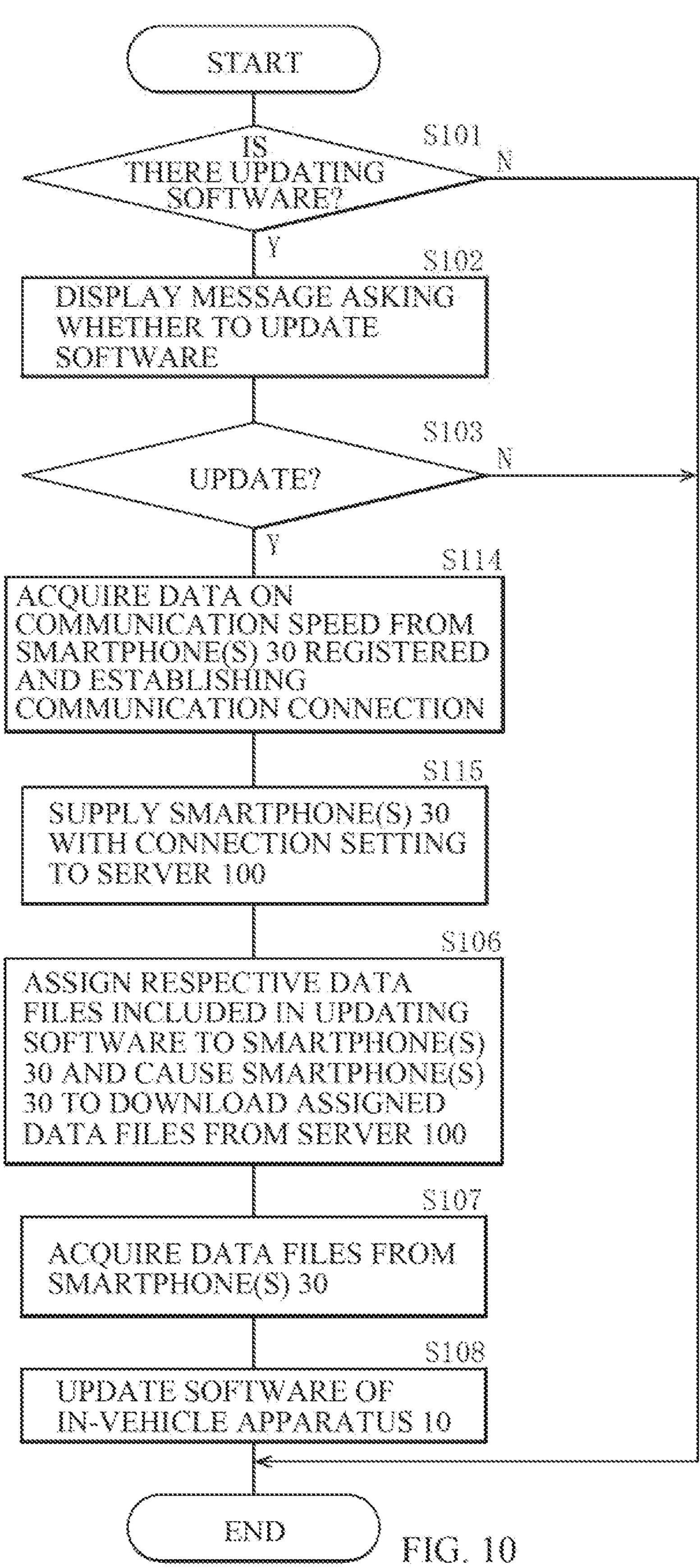
FIG. 10 is a flowchart of an exemplary operation of the in-vehicle apparatus illustrated in FIG. 9.

FIG. 10 illustrates an exemplary operation of the in-vehicle apparatus 40. The process including Step S101 to Step S103, and the process including Step S106 to Step S108 may be similar to those in the example embodiment described above (see FIG. 4).

When the operation input unit 13 receives the instruction to update the software (Step S103: Y), the communication connection management unit 54 may acquire the data on the communication speed of the one or more smartphones 30 registered and currently establishing the communication connection (Step S114). Thereafter, the communication connection management unit 54 may manage the smartphone 30 establishing the communication connection to the in-vehicle apparatus 40 in association with the communication speed of the smartphone 30.

Thereafter, the communication connection management unit 54 may supply the one or more smartphones 30 with the data indicating the connection setting to the server 100 (Step S115).

When the smartphones 30 are establishing the communication connection to the in-vehicle apparatus 40, the download control unit 25 may assign the respective data files to the smartphones 30 based on the respective communication speeds of the smartphones 30 acquired in Step S114. For example, the download control unit 25 may assign a data file having a large file size to the smartphone 30 having a high communication speed, and a data file having a small file size to the smartphone 30 having a low communication speed.

Further, two or more of the modification examples described above may be combined.

The disclosure has been described with reference to the example embodiments and the modification examples; however, the disclosure is not limited to the example embodiments and modification examples described above, and various modifications may be made.

For example, in the example embodiments and the modification examples described above, the QR code may be used; however, the disclosure is not limited thereto, and any pattern image may be used that includes the data indicating the connection setting to the server 100 and the data indicating the connection setting to the in-vehicle apparatus 10.

For example, in the example embodiments and the modification examples described above, the two smartphones 30 may be used in Cases C2 and C3; however, the disclosure is not limited thereto, and three or more smartphones may be used.

For example, in the example embodiments and the modification examples described above, the smartphones 30 may be used; however, the disclosure is not limited thereto, and various portable devices such as tablet devices may be used.

For example, the process illustrated in FIG. 4 is a mere example, and some of the steps in the process may be omitted, or additional steps may be added to the process.

The effects described herein are mere examples, and the effects of the disclosure are not limited to those described herein. Other effects may thus be obtained for the disclosure.

Further, the disclosure may have the following aspects.

(1) An in-vehicle apparatus including:
- a communicator configured to communicate with portable devices; and
- a processor configured to
  - acquire speed datasets, each of the speed datasets indicating a communication speed between each of the portable devices and the server from each of the portable devices communicably coupled to the communicator,
  - assign respective data files to be downloaded from the server to the portable devices, and
  - request the portable devices to download the respectively assigned data files from the server.

(2) The in-vehicle apparatus according to (1), in which the processor is configured to
- assign a first data file having a first file size to a first portable device among the portable devices, the first portable device being configured to communicate with the server at a first communication speed, and
- assign a second data file having a second file size to a second portable device among the portable devices, the second portable device being configured to communicate with the server at a second communication speed, the second file size being smaller than the first file size, the second communication speed being lower than the first communication speed.

(3) The in-vehicle apparatus according to (1) or (2), in which the communication speed indicated by each of the speed datasets is an actual communication speed obtained upon communication between each of the portable devices and the server.

(4) The in-vehicle apparatus according to (1) or (2), in which the communication speed indicated by each of the speed datasets is a communication speed estimated based on a standard of wireless communication to be used upon communication between each of the portable devices and the server.

(5) The in-vehicle apparatus according to any one of (1) to (4), in which the communicator is configured to receive the data files downloaded from the server and transmitted from the portable devices communicably coupled to the communicator.

According to the in-vehicle apparatus according to the example embodiments of the disclosure, it is possible to achieve effective downloading in a short time.

The invention claimed is:

1. An in-vehicle apparatus comprising:
- a communicator configured to communicate with portable devices; and
- a processor configured to confirm whether a notification indicating that data files are in a server has been received from the server;
  - acquire speed datasets, each of the datasets indicating a communication speed between each of the portable devices and the server from each of the portable devices communicably coupled to the communicator,
  - sequentially assign the data files configured to be downloaded from the server to the portable devices respectively based on the speed datasets,
  - send requests to the portable devices to sequentially download the respectively assigned data files from the server,
  - receive, from the portable devices, the respectively assigned data files that were downloaded by the portable devices from the server, and
  - update software used in the in-vehicle apparatus based on the data files received from the portable devices.

2. The in-vehicle apparatus according to claim 1, wherein the processor is configured to
- assign a first data file of the data files having a first file size to a first portable device among the portable devices, the first portable device being configured to communicate with the server at a first communication speed, and
- assign a second data file of the data files having a second file size to a second portable device among the portable devices, the second portable device being configured to communicate with the server at a second communication speed, the second file size being smaller than the first file size, the second communication speed being lower than the first communication speed.

3. The in-vehicle apparatus according to claim 1, wherein the communication speed indicated by each of the speed datasets comprises an actual communication speed obtained upon communication between each of the portable devices and the server.

4. The in-vehicle apparatus according to claim 1, wherein the communication speed indicated by each of the speed datasets comprises a communication speed estimated based on a standard of wireless communication to be used upon communication between each of the portable devices and the server.

5. The in-vehicle apparatus according to claim 1, further comprising a display, wherein the processor is configured to
- generate a pattern image comprising data indicating (i) a connection setting to the server and (ii) a connection setting to the in-vehicle apparatus,
- wherein the display is configured to display the pattern image.

6. The in-vehicle apparatus according to claim 1, wherein the notification includes data on names of the data files and data on file sizes of the data files.

7. The in-vehicle apparatus according to claim 1, wherein the portable devices are registered in advance to the in-vehicle apparatus, and the processor is configured to acquire the speed datasets from the portable devices that are registered and communicably coupled to the communicator.

8. The in-vehicle apparatus according to claim 7, wherein the processor is configured to supply the portable devices with data indicating a connection setting to the server.

9. The in-vehicle apparatus according to claim 1, wherein the processor is configured to assign the data files to the portable devices respectively based on the speed datasets before any of the portable devices starts downloading the respectively assigned data files from the server.

10. The in-vehicle apparatus according to claim 1, wherein the processor is configured to assign at least one of the data files to at least one of the portable devices after at least another one of the portable devices has started downloading its respectively assigned data file from the server.

11. The in-vehicle apparatus according to claim 1, further comprising:

a display configured to display a message asking an occupant whether to update the software used in the in-vehicle apparatus, and an operation input unit configured to receive an operational input by the occupant, wherein the processor is configured to perform the assigning of the data files and the sending of the requests in response to the operation input unit receiving an instruction to update the software.

* * * * *